(12) United States Patent
Carveth et al.

(10) Patent No.: US 8,850,673 B2
(45) Date of Patent: Oct. 7, 2014

(54) ERGONOMIC SNAP HOOK

(76) Inventors: William Harold Carveth, Edmonton (CA); William Vincent Carveth, Edmonton (CA)

( * ) Notice: Subject to any disclaimer, the term of this patent is extended or adjusted under 35 U.S.C. 154(b) by 185 days.

(21) Appl. No.: 12/923,742

(22) Filed: Oct. 6, 2010

(65) Prior Publication Data

US 2011/0078881 A1 Apr. 7, 2011

Related U.S. Application Data

(60) Provisional application No. 61/278,398, filed on Oct. 7, 2009.

(51) Int. Cl.
*F16B 45/02* (2006.01)

(52) U.S. Cl.
CPC ...................................... *F16B 45/02* (2013.01)
USPC ......................................... 24/599.7; 24/599.4

(58) Field of Classification Search
USPC ............. 24/599.4, 599.5, 599.6, 599.7, 599.1
See application file for complete search history.

(56) References Cited

U.S. PATENT DOCUMENTS

| 185,980 | A | | 1/1877 | Steele | |
|---|---|---|---|---|---|
| 358,124 | A | * | 2/1887 | Semple | 112/117 |
| 645,853 | A | * | 3/1900 | huberdeau | 267/71 |
| 688,006 | A | * | 12/1901 | Rickman | 24/599.5 |
| 691,630 | A | * | 1/1902 | huberdeau | 24/599.6 |
| 815,723 | A | | 11/1905 | Mahoney | |
| 1,545,377 | A | * | 7/1925 | Westmoreland | 294/82.2 |
| 1,626,866 | A | * | 5/1927 | Neilson | 294/82.2 |
| 5,749,325 | A | * | 5/1998 | Albanese | 119/792 |
| 6,161,264 | A | * | 12/2000 | Choate | 24/599.5 |
| 6,832,417 | B1 | | 12/2004 | Choate | |
| 8,234,758 | B2 | * | 8/2012 | Liu | 24/265 H |

* cited by examiner

*Primary Examiner* — Jack W Lavinder
(74) *Attorney, Agent, or Firm* — Nathan Woodruff

(57) ABSTRACT

Use of a snap hook requires the capture loop to be cradled in a joint of the index finger to prevent it from rolling in the hand. Hooks having a cylindrical body roll easily, and those having an oval section capture loop, roll more easily. When a hook rolls, its loop can move to a position where it blocks access to the gap, requiring it to be repositioned in the hand. Ergonomic requirements provided in this hook include: spacing the hand a maximal distance from the gap, stability from rolling in the hand, and minimal movement of the hand members in operation. The hand does not close around the hook; it may be held between the thumb and a finger, a natural configuration in which the hand retains the lie of its usual open form. Stability from rolling results from the forces of contact being directed within the borders of the wide contact surfaces of the body and the button. The larger the contact forces, the more stable the hook is.

22 Claims, 6 Drawing Sheets

ERGONOMIC SNAP HOOK

This application claims the benefit of PPA Ser. No. 61/278,398 filed 2009 Oct. 7 by the present inventors, which is incorporated by reference.

FIELD

This application relates generally to snap hooks, specifically to an ergonomic snap hook.

BACKGROUND

The dominant snap hook has a cylindrical body and a somewhat circular capture loop. The body contains a closing spring and a bolt which are retained in the cylinder by a tip of the capture loop.

Another type of snap hook is found on products distributed by Aspen Pet Products, Inc., marketed under the trade name Petmate.

SUMMARY

The present embodiment provides a snap hook of enhanced utility being less awkward to handle and use, less uncomfortable to the touch, and which provides less obstruction by the hand at a capture gap. A number of factors which lessens discomfort include the provision of wide contact surfaces; one for the thumb and one for a finger. The wide surfaces reduce the tendency of the hook to roll in the hand. Reduced rolling renders the gap more accessible and the hook less awkward to use. The embodiment places the thumb or finger near to an end of a lever, this end located opposite to a gap end, an optimal configuration. Access to the gap is improved, further rendering the hook less awkward to use. Details of the embodiment are further included.

In accordance with the embodiment, one end of the body comprises a curved member ending in a tip, the curved member being a large portion of a capture loop. The end opposite comprises a connector end.

A central region of the body has an elongated aperture in which a lever is installed. One end of the lever is a gate, this portion being a complementary portion of the capture loop.

The central region of the body has a wide contact surface on the same side as the tip. In relation to the elongated aperture, it is on the side opposite the capture loop end.

The lever has a gate end, and an end opposite which projects through the body as a terminus, upon which a button is mounted. The button comprises a wide contact surface and a cavity in which an end of the closing spring is located. The body has a cavity in which the other end of the closing spring is located. The cavity is on the same side of the hook as the button contact surface, located essentially opposite the body contact surface. The body has a connector end for the attachment of a swivel.

The body has two blind holes in mirrored locations in the elongated aperture at the pivot. A pin locates the lever in the aperture, each pin end occupying a blind hole.

Another embodiment has a unitary lever having a gate end and a control end. The control end comprising an operative surface, and a cavity for locating an end of the closing spring.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
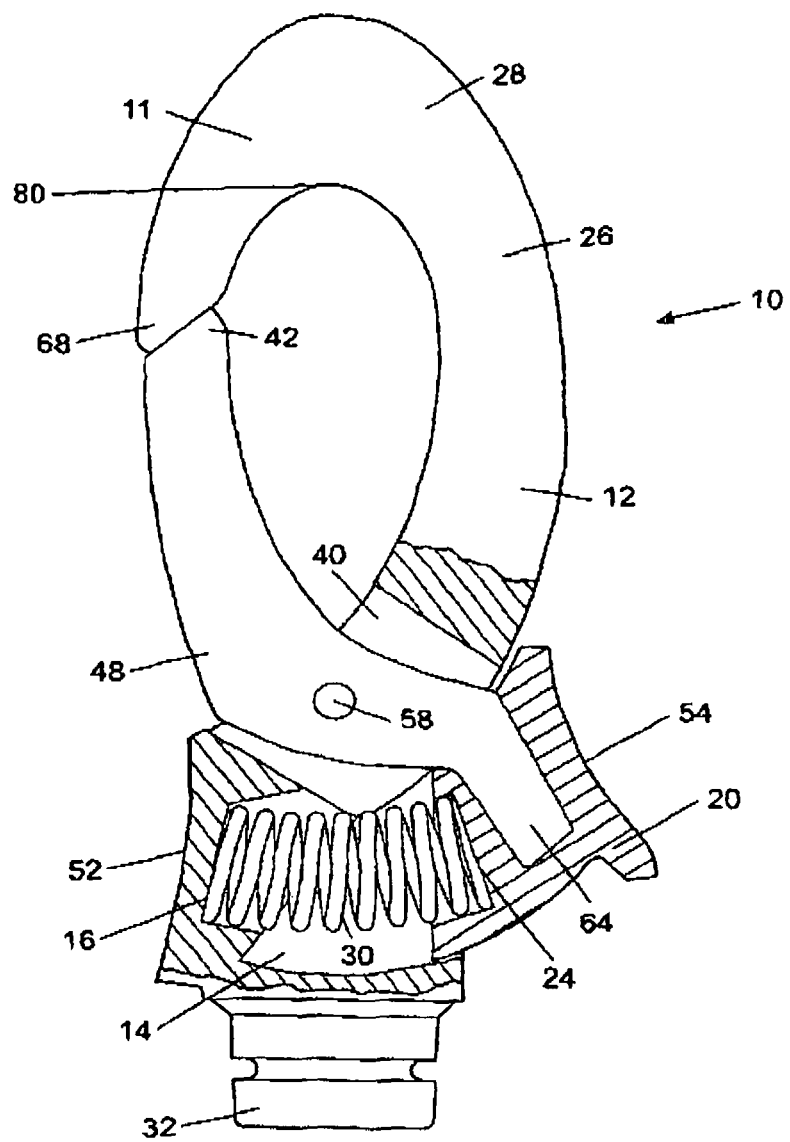
FIG. 1 is a partial section on central plane of the hook

A hook generally identified by reference numeral 10, will now be described with reference to FIG. 1 through FIG. 5. Structure and Relationship of Parts:

Description—FIG. 1—Assembled Hook

FIG. 1 of a hook 10 is a partial section of the body 12 on either side of the elongated aperture 40, and a section of the button 20. A closing spring 30 is in a curved configuration, reacting against a body spring seat 16 in a cavity 14, and reacting against a button spring seat 24. The closing spring 30, a lever 48, and a pivot pin 58 are not sectioned. A large portion of the body 12 is a segment of a capture loop 26. The segment extends from near an elongated aperture 40, near the central region of the body 12, to a bail 11 at the capture loop end 28, and curves back part way in the direction of the aperture 40, terminating in a tip 68. The lever 48 comprises a gate end 42 which covers from contact with the tip 68 to the region of the pivot pin 58, and a control end having a button 20 attached to a terminus 64. The button 20 has a terminus cavity 66 (FIG. 3A), a spring seat 24, and a surface 54. The gate end 42 comprises a complementary segment of the capture loop 26. The hook has the closing spring 30, the pivot pin 58, and a surface 52. The combined width of contact surfaces 52 and 54 must be at least half the distance from the pivot pin 58 to the furthest linear distance on the inner perimeter of the capture loop 26, the furthest point on the inner perimeter from the pivot pin 58 being apex 80, and must also be at least three quarters of the distance between the contact surfaces 52 and 54 when the body 12 is in the closed position.

Figure 2:
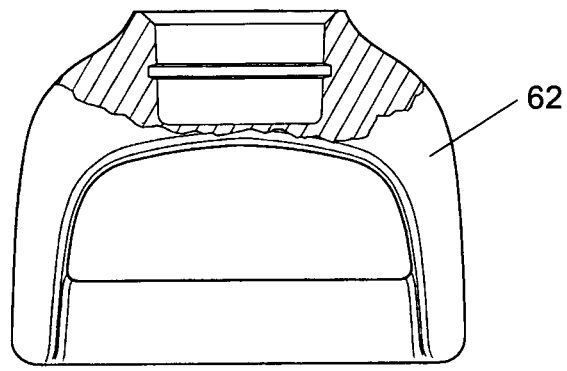
FIG. 2 is a partially sectioned view of a swivel for connector end attachment

Description—FIG. 2—Swivel

FIG. 2 is a partially sectioned view of a swivel 62 for attachment to a connector end 32 (FIG. 1).

Figure 3A:
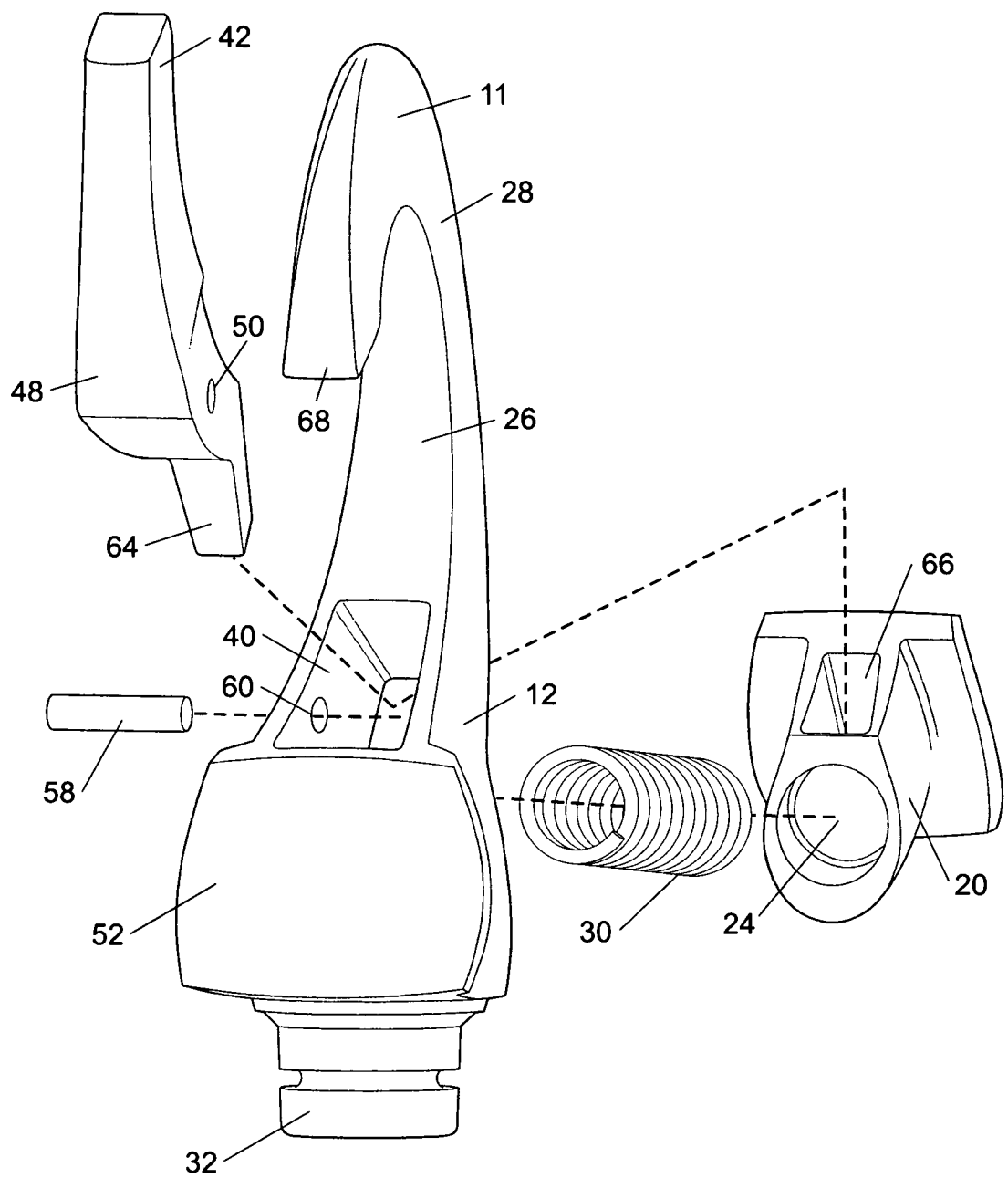
FIG. 3A is an exploded view showing the tip side of the body

Description—FIG. 3A—Tip Side View

FIG. 3A shows the body surface 52 on the body 12, and an adjacent side. The surface 52 is on the same side of the body 12 as the tip 68. The capture loop 26 is on one side of the aperture 40, and the surface 52 is on the other. The body 12 has a pin aperture 60 positioning the lever 48.

Figure 3B:
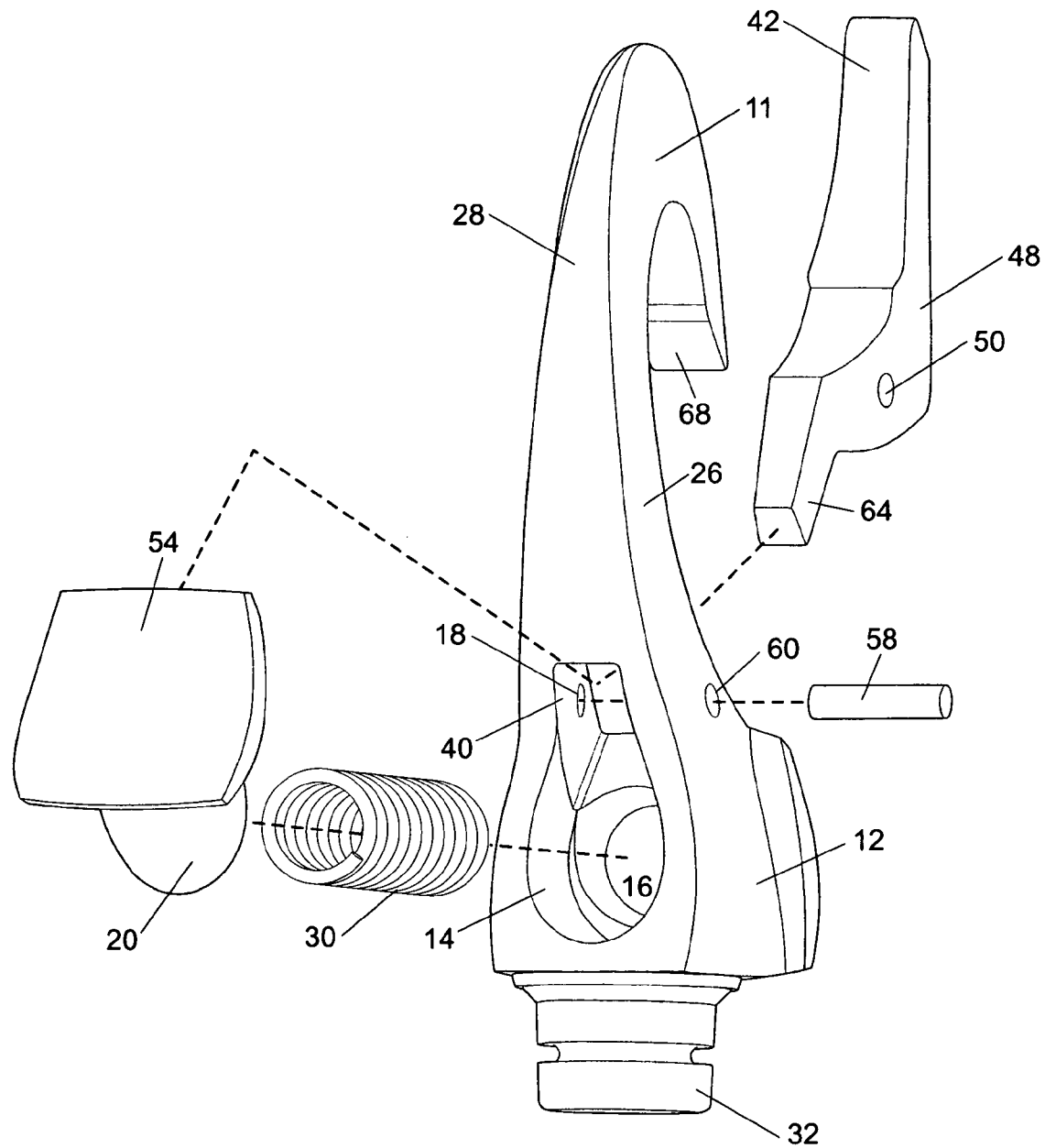
FIG. 3B is an exploded view showing the cavity side of the body

Description—FIG. 3B—Cavity Side View

FIG. 3B is a view of a side showing the body cavity 14 with the spring seat 16, and the other adjacent side. The cavity 14 is on the side of the body 12 opposite the surface 52 (FIG. 3A). The surface 52 and the cavity 14 are nearly directly opposite each other.

Figure 4:
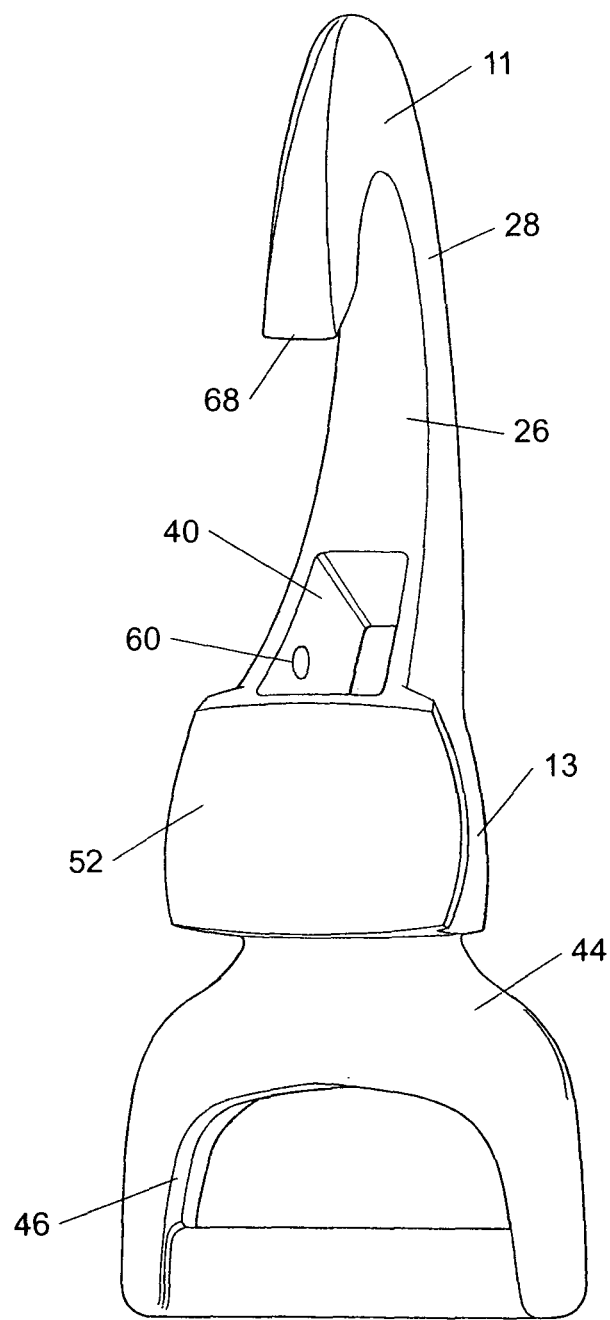
FIG. 4 is a perspective view of a body having a lead end loop

Description—FIG. 4—Lead End Loop Body

The body 13 has a lead end 44 opposite the capture loop end 28. The lead end 44 has an integral lead loop 46.

Figure 5A:
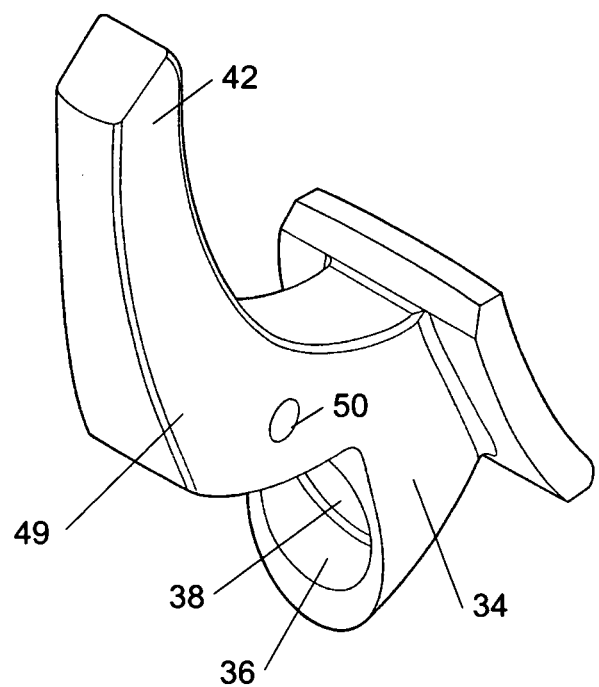
FIG. 5A is a perspective view of a one piece lever
Figure 5B:
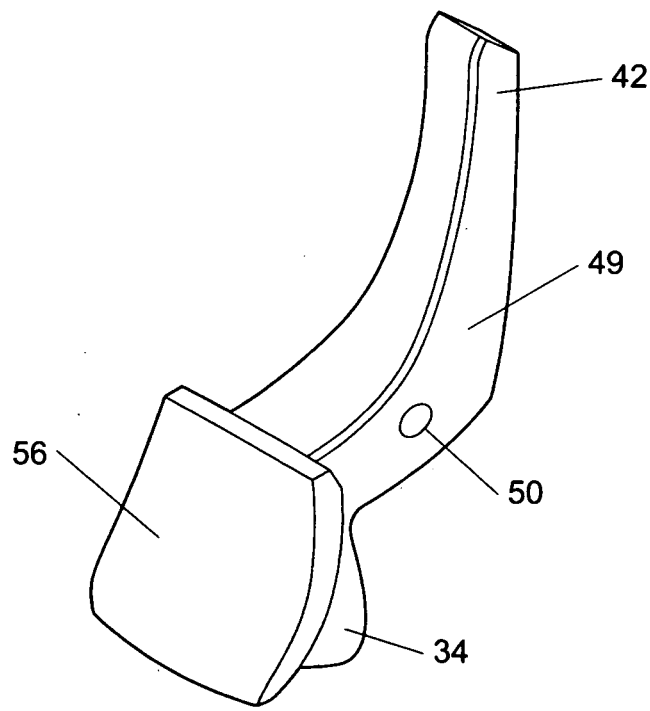
FIG. 5B is a perspective view of a one piece lever

Description—FIG. 5A and FIG. 5B—One Piece Lever

FIG. 5A and FIG. 5B are perspective views of an integrated lever 49. The lever 49 includes a control end 34 opposite the gate end 42. The control end 34 includes a control end surface 56, and a control end cavity 36 which has a control end spring seat 38.

An embodiment is assembled by inserting the gate end 42 of the lever 49 into the elongated aperture 40 on the cavity 14 side of the body 12, while simultaneously positioning the closing spring 30 on a body spring seat 16 and the control end spring seat 38. The pivot pin 58 secures the lever 49 in place in the body 12.

In another embodiment the body 12 has two apertures 60 in mirrored positions on sides opposite in the elongated aperture 40.

In another embodiment the body 12 has a pin aperture 60 and a blind hole 18 in mirrored positions on sides opposite in the elongated aperture 40.

Another embodiment has two blind holes 18 in mirrored positions on sides opposite in the elongated aperture 40. The blind holes 18 may be made in the process of casting the body 12. The body 12 may be made with the walls of the aperture 40 bulging out in the region of the blind holes 18. The distance between the walls at the region of the blind holes 18 is greater than the length of the pivot pin 58.

An assembly comprising the lever 48 and the pin 58 is placed into the aperture 40 on the gate side of the body 12. An end of the pin 58 is placed in a blind hole 18. The terminus 64 protrudes from the cavity side of the body 12. The unsupported end of the pin 58 is aligned with the other blind hole 18. The sides of the body 12 in the region of the pivot pin 58 are forced inward to a permanent set sufficient to secure the pin 58 and lever 48 in place.

Advantages of this embodiment include no visible end of the pin 58, and security from endwise egress of the pin 58 through a side of the body 12.

A prototype hook was made with substantially planar and wide surface 52 on the body 12, and the substantially planar and wide surface 54 on the button 20. The width of the body surface 52 may be made greater than the sum of the diameter of the closing spring 30, the allowances for the walls of the button 20, the clearances on each side of the button 20, and the side thicknesses of the body 12 at the region of the closing spring 30. The widths of the button surface 54 and the body surface 52 are added together for a combined width.

It is not necessary for the widths of the contact surfaces to be similar. The combined widths determine the stability against rolling in the hand.

Operation:

The hook 10 would be used most commonly by holding it between the ends of the thumb and index finger, the contact areas being the body surface 52 and the button surface 54. The forces by the thumb and finger move these pads toward each other resulting in the lever 48 pivoting on the pivot pin 58, moving the gate end 42 to the open position. This may be used for putting the hook 10 onto a loop, or removing it.

There is an alternate and convenient way to put the hook 10 onto a securely held rigid loop. The body 12 is held with the thumb and middle finger on the sides adjacent to the cavity 14 and the body surface 52, the gate side facing away from the user. The index finger is positioned on the convex surface of the capturing loop segment 26 of the body 12, and the hook 10 is positioned with the gate end 42 of the lever 48 in contact with a loop to be captured. The index finger presses on the capture loop segment 26 of the body, deflecting the gate end.

The index finger continues to press as the hook 10 is moved toward the user. At the point where the loop to be captured has moved beyond the gate end 42, the lever 48 is pivotally unconstrained. The gate end 42 closes to the tip 68, capturing the loop.

Present snap hooks place the end of the thumb immediately at the gap upon opening, the thumb end pointing toward the gap. Creating a gap is an awkward task for the thumb with present hooks. The end joint of the thumb must be bent a maximum degree both to create, and to maintain an open gap. It is a region of generally high loads and stresses, where thumb nails, in particular, are broken. Occasionally, thumb nails are broken when caught between the bolt and the hook body. Grasping one of the predominant type hooks involves the fingers curling around a cylindrical body, which is about one centimeter in diameter. Finger joints must flex to a nearly maximum degree to hold such a small diameter body. If there is a joint problem in the thumb, in particular, or the fingers, the ability to operate one of the predominant type hooks may be compromised. If the end joint of the thumb is only moderately damaged, the hand may not be able to operate a predominant type hook.

Operation of the hook 10 involves the thumb and finger using contact surfaces opposite the gap, relative to the pivot location. Neither the thumb nor fingers are pointed at the gap, rather, they are sideways to it. This places the thumb and finger nails in lower stress locales, so they are subject to less breakage. The most natural function of the hand, thumb touching fingers, involves minimal articulation of all of its joints. This hook 10 was created to use this function to advantage. So little articulation is needed to operate this hook that a hand having an immobile thumb can use it readily.

The predominant type of snap hook has a bolt forced to the closed loop position by a compression spring. The loop is opened by applying a force on the small knob of the bolt, compressing the spring. In the process of moving the bolt, a component of the force results in friction retarding movement of the bolt. Two forces have to be overcome to move the bolt: one is the spring force, and the other is the friction force.

For convenience, operation of the prototype hook 10 involved using a pivot pin extending about four centimeters beyond the body. Operation of the hook revealed that the pin could be rotated by hand with ease as the hook was opened and closed. The reason is the contact forces are close to the axis of the spring. There is negligible friction to be overcome from the pin. The only significant force to be overcome in operation is the spring force.

Variations:

A number of combinations are possible with two types of bodies, two types of levers, and four pin aperture combinations.

Cautionary Warnings:

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. Those skilled in the art will appreciate that various adaptations and modifications of the described embodiments can be configured without departing from the scope of the claims. The illustrated embodiments have been set forth only as examples and should not be taken as limiting the invention. It is to be understood that, within the scope of the following claims, the invention may be practiced other than as specifically illustrated and described.

What is claimed is:

1. A hook, comprising:
a first member and a second member, the first and second members being pivotally connected about a pivot axis wherein the pivot axis is a fulcrum between a first portion and a second portion of each of the first and second members, the first portions of the first and second members defining a loop, the loop having an end opposite the pivot axis;
a coil compression spring mounted between the second portions of the first and second members and biasing the first and second members to a closed position;
a first contact surface carried by the second portion of the first member and a second contact surface carried by the second portion of the second member, the first and second contact surfaces being disposed opposite each other, the first and second contact surfaces being substantially the same width, the contact surfaces moving one of the first and second members to an open position within the loop as pressure is applied to the contact surfaces, the contact surfaces each having a width in a direction parallel to the pivot axis, wherein the sum of the widths is equal to at least half the distance from the pivot axis to the furthest linear distance on the inner perimeter of the loop and to at least three quarters of the distance between the contact surfaces when the first and second members are in the closed position.

2. The hook of claim 1, wherein the first member has an attachment on an end opposite the loop.

3. The hook of claim 2, wherein the attachment is connected to the first member by a swivel connection.

4. The hook of claim 1, wherein the first member comprises a bail and the second member comprises a gate.

5. The hook of claim 1, wherein at least one contact surface is comprises a single concave surface in a direction perpendicular to the pivot axis.

6. The hook of claim of 1, wherein at least one of the first and second members is made from two or more components.

7. The hook of claim 1, wherein the first member comprises at least one pin aperture.

8. The hook of claim 1, wherein the second contact surface moves substantially toward the first contact surface when the first and second members move from the closed position toward the open position.

9. The hook of claim 1, wherein the contact surfaces are substantially straight along the width.

10. The hook of claim 1, wherein the second portion of the first member has a first spring engaging cavity that encloses a first end of the coil compression spring and the second portion of the second member has a second spring engaging cavity that encloses a second end of the coil compression spring, the first spring engaging cavity telescopically receiving the second spring engaging cavity to define a telescopic enclosure that encloses the coil compression spring, the telescopic enclosure being curved in the direction of travel of the second portions of the first and second members.

11. The hook of claim 1, wherein each of the contact surfaces comprises a single concave surface in a direction perpendicular to the pivot axis, wherein a center of each concave surface is aligned with a center of a respective end of the coil compression spring.

12. A method of operating a hook, comprising the steps of:
providing:
a first member and a second member, the first and second members being pivotally connected about a pivot axis wherein the pivot axis is a fulcrum between a first portion and a second portion of each of the first and second members, the first portions of the first and second members defining a loop, the loop having an end opposite the pivot axis;
a coil compression spring mounted between the second portions of the first and second members and biasing the first and second members to a closed position;
a first contact surface carried by the second portion of the first member and a second contact surface carried by the second portion of the second member, the first and second contact surfaces being disposed opposite each other, the first and second contact surfaces each having a width in a direction parallel to the pivot axis, the widths of each of the contact surfaces being substantially the same, wherein the sum of the widths is equal to at least half the distance from the pivot axis to the furthest linear distance on the inner perimeter of the loop, and to at least three quarters of the distance between the contact surfaces with the first and second members in the closed loop configuration; and
applying:
pressure to the contact surfaces to move the first and second members from the closed position to an open position.

13. The method of claim 12, wherein the first member has an attachment on the end opposite the loop.

14. The method of claim 13, wherein the attachment is connected to the first member by a swivel connection.

15. The method of claim 12, wherein the first member comprises a bail and the second member comprises a gate.

16. The method of claim 12, wherein at least one contact surface is comprises a single concave surface in a direction perpendicular to the pivot axis.

17. The method of claim 12, wherein at least one of the first and second members is made from two or more components.

18. The method of claim 12, wherein at least one contact surface is concave.

19. The method of claim 12, wherein the first member comprises at least one pin aperture.

20. The method of claim 12, wherein the second contact surface moves substantially toward the first contact surface when the first and second members move from the closed position toward the open position.

21. The method of claim 12, wherein the contact surfaces are substantially straight along the width.

22. The method of claim 12, wherein the second portion of the first member has a first spring engaging cavity that encloses a first end of the coil compression spring and the second portion of the second member has a second spring engaging cavity that encloses a second end of the coil compression spring, the first spring engaging cavity telescopically receiving the second spring engaging cavity to define a telescopic enclosure that encloses the coil compression spring, the telescopic enclosure being curved in the direction of travel of the second portions of the first and second members.

* * * * *